United States Patent [19]

Ahn et al.

[11] Patent Number: 5,531,125
[45] Date of Patent: Jul. 2, 1996

[54] METHOD AND DEVICE FOR SIMULTANEOUSLY MEASURING THE FLOW SPEED AND THE DEPTH OF A RIVER

[75] Inventors: Kyu-Hong Ahn; Hak-Su Chang, both of Seoul, Rep. of Korea

[73] Assignee: Korea Institute of Science and Technology, Seoul, Rep. of Korea

[21] Appl. No.: 360,301

[22] Filed: Dec. 21, 1994

[30] Foreign Application Priority Data

Dec. 24, 1993 [KR] Rep. of Korea ................. 93-29487

[51] Int. Cl.$^6$ ..................................................... G01F 1/00
[52] U.S. Cl. .................. 73/861.27; 73/170.27; 73/170.13
[58] Field of Search .................. 73/861, 861.06, 73/861.08, 861.18, 861.27, 861.28, 215, 170.01, 170.07, 170.08, 170.09, 170.13, 170.29, 170.31, 170.32, 170.33, 170.34

[56] References Cited

U.S. PATENT DOCUMENTS

| 4,015,470 | 4/1977 | Morrison | 73/861.03 |
| 4,094,193 | 6/1978 | Gerlach | 73/861.27 |
| 4,308,749 | 1/1982 | Clavelloux et al. | 73/170.13 |
| 4,593,561 | 6/1986 | Gavrilovic | 73/170.29 |

FOREIGN PATENT DOCUMENTS

| 2628336 | 1/1978 | Germany | 73/861.27 |
| 4540356 | 3/1966 | Japan | 73/861.27 |
| 89-1595 | 5/1989 | Rep. of Korea . | |
| 89-2320 | 6/1989 | Rep. of Korea . | |
| 90-2320 | 4/1990 | Rep. of Korea . | |
| 90-6408 | 8/1990 | Rep. of Korea . | |
| 735923 | 5/1980 | U.S.S.R. | 73/861.27 |

*Primary Examiner*—Richard Chilcot
*Assistant Examiner*—R. Biegel
*Attorney, Agent, or Firm*—Oblon, Spivak, McClelland, Maier & Neustadt

[57] ABSTRACT

A method and a device for simultaneously measuring the flow speed and the depth of a river is provided. The method and the device use ultrasonic wave to measure average flow speeds at a plurality of points in the water flow of a river to measure the flow rate of the river. The device comprises a vertical rod (7), and inclined rod (9), a vertical rod cylinder (8) movable up and down along the vertical rod, an inclined rod cylinder (10), through which the inclined rod can move, installed at an axis fixed perpendicular to the vertical rod cylinder (8), an angle sensor (15) measuring the angle between the vertical rod (7) and the inclined rod (9), support rods (14) installed at said axis and the ends of the vertical rod and the inclined rod (9) opposite to said axis, ultrasonic vibrators (4, 4', 6, 6') installed at the ends of said support rods (14) spaced from the vertical rod and the inclined rod, a level (11) attached to the top of the vertical rod (7), and a calculating part (16). Said device measures the distances between said ultrasonic vibrators (4, 4', 6, 6'), ultrasonic wave propagation times, and the angle between the inclined rod and the water surface and then evaluates the flow rate and the depth of the water from the measured data by the time difference method or the frequency difference method.

2 Claims, 9 Drawing Sheets

METHOD AND DEVICE FOR SIMULTANEOUSLY MEASURING THE FLOW SPEED AND THE DEPTH OF A RIVER

BACKGROUND OF THE INVENTION

1. Field of the Invention

The present invention relates to a method and a device for simultaneously measuring the flow rate and the depth of a river utilizing ultrasonic-measuring technology.

2. Description of the Prior Art

In the standard method of measuring the flow rate of a river, the rate is calculated by the equation: flow speed×area (V×S). Propeller or cup type flowmeters (called mechanical flowmeters), or other local flowmeters using other principles, are used in order to measure the flow speed perpendicular to the flow cross-sectional area of the river. Although, the total average flow speed of the water passing through the flow cross-section should be measured in order to determine the flow rate of a river, tin fact, the general procedure used is: the total cross-section (S) is divided into a plurality of partial cross-sections ($S_i$); local average perpendicular flow speeds ($V_{xi}$) are calculated by measuring flow speeds ($V_i$) with a local flowmeter at a plurality of points in a vertical line in each partial cross-section ($S_i$) to measure the average flow speed of each partial cross-section ($S_i$); and $\Sigma q_i$, the sum of partial flow rate $q_i = S_i \times V_{xi}$, is calculated to determine the flow rate of the river.

The number of local flow speed measuring points depends on the allowable error of a river flow rate measurement. FIG. 1 shows an example using a 9-point measuring method.

When the river is not deep, say ≦3 m, a flow speed measuring rod (1) with a flowmeter attached thereon is immersed into the river as shown in FIG. 2. The depth of the river is measured by reading a scale notched on the immersed flow speed measuring rod. That is, the rod also serves as a measuring rule. The measuring rod (1) can have various structures and there is a type in which the rod is stuck into the bottom of the river and the flowmeter is translated along the rod.

The disadvantages of the known methods of measuring the flowrate of a river with local flowmeters are as follows:

(1) It takes a lot of time to measure the local flow speeds at each point. Accordingly, it is time-consuming to measure the flow speeds at a plurality of points which is needed for improving the measuring accuracy of the average perpendicular flow speed ($\overline{V}_x$). Since the fluctuation of local speeds ($V_i$) is high, an average value of the local flow speed ($\overline{V}_i$) should be taken, which can require 5-minutes of continuous measurement. Local flow speed measuring points are selected for relatively precise evaluation of the vertical flow speed distribution. For example, the positions of the measuring points of Vi for 5-point measurements are Ho, 0.2 H, 0.6 H, 0.8 H, and H. Ho and H are points as near as possible to the surface and the bottom of a river, respectively. As it takes time to move the flowmeter to individual points, the flow speed measuring productivity is very low.

(2) In particular, accurate flow speed measurement is necessary at the bottom of a river because the flow speed distribution is complex. However, it is impossible for mechanical flowmeters to measure the flow speeds near the surface and bottom of a river because the diameter of the propeller or the cup-rotor of the mechanical flowmeters are relatively large.

FIG. 3 illustrates one method of perpendicular flow speed using ultrasonic waves. The flow speed measuring method using a reflected ultrasonic beam is performed using a pipe-type ultrasonic flowmeter, for example 990 DB developed by Controlotron, U.S.A. FIG. 3 shows vibrators (4, 4') transmitting and receiving ultrasonic waves (e.g., piezoelectric ceramic), and a support (5) locating and supporting the vibrators at respective points (A, B) on the surface of the water. Although the method shown in FIG. 3 can measure the perpendicular average flow speed ($\overline{V}_x$) perpendicular to the depth of water (H), the method has the following defects.

(1) It is almost impossible for the ultrasonic wave to be reflected without dispersion at a predetermined point (O) of the bottom of a river and reach the vibrator receiving the ultrasonic wave because the bottom is quite irregular. Thus, a reflecting plate should be placed on the bottom.

(2) When measuring the flow speed using the difference method, there is an advantage in that by knowing only the distance L=AB, the average perpendicular speed ($\overline{V}_x$) can be calculated using the general expression $\Delta t = 2LV/C^2$, without the need for knowing the incident or reflecting angle ($\Theta$) and the propagation distance ($l_1$, $l_2$) of the ultrasonic pulse with paths A→O→B or B→O→A. However, small errors in measuring the ultrasonic wave speed (C) results in large errors in calculating the flow speed.

(3) When measuring the flow speed using the frequency difference method, i.e., using the general expression $\Delta f = 2V/L$, the condition $l_1 = l_2 = l$ should be obeyed and the reflection angle ($\Theta$) should be known. However, accurate measurement of such data is quite difficult.

(4) The distance L=AB should always be varied to ensure the optimum reflecting angle according to the change of the water depth (H).

Besides the above-described defects, there are other defects which are common to any ultrasonic flow speed measuring method and are explained in the description of other methods.

The above-described method is beneficial when the water is deep, but because of its defects, has a disadvantage in that it is difficult to apply when the depth is relatively shallow (H≦3 m).

SUMMARY OF THE INVENTION

Therefore, the purpose of the invention is to solve the above-described defects and to provide a new method and a device for simultaneously measuring the flow speed and the depth of a river, applicable in cases where the depth is relatively shallow.

BRIEF DESCRIPTION OF THE DRAWINGS

The invention is described below in detail with reference to the accompanying drawings in which.

DESCRIPTION OF THE EMBODIMENTS

Figure 1:
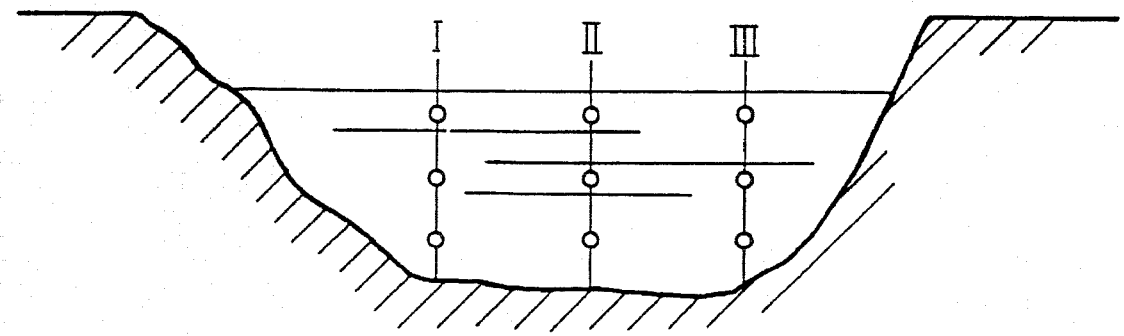
FIG. 1 is a diagrammatic view showing the method measuring the flow speed of a river using a 9 point flow speed measuring principle.
Figure 2:
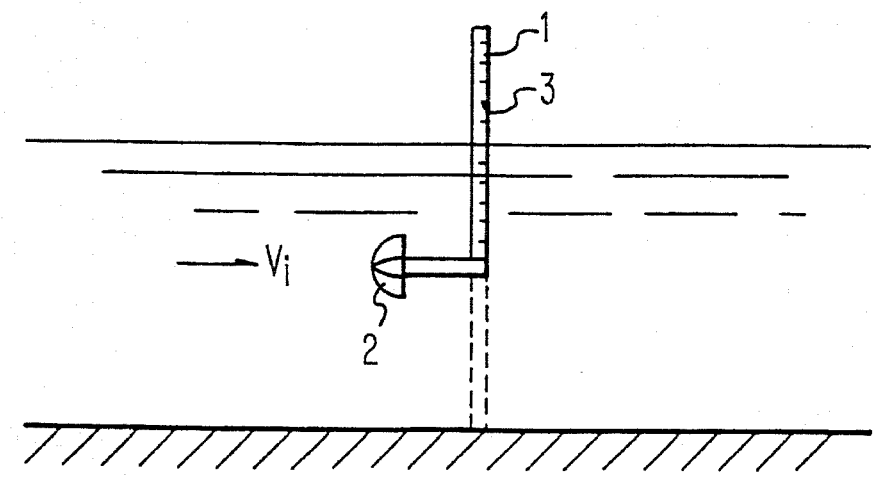
FIG. 2 is a diagrammatic view showing a flow speed measuring rod with a flowmeter.
Figure 3:
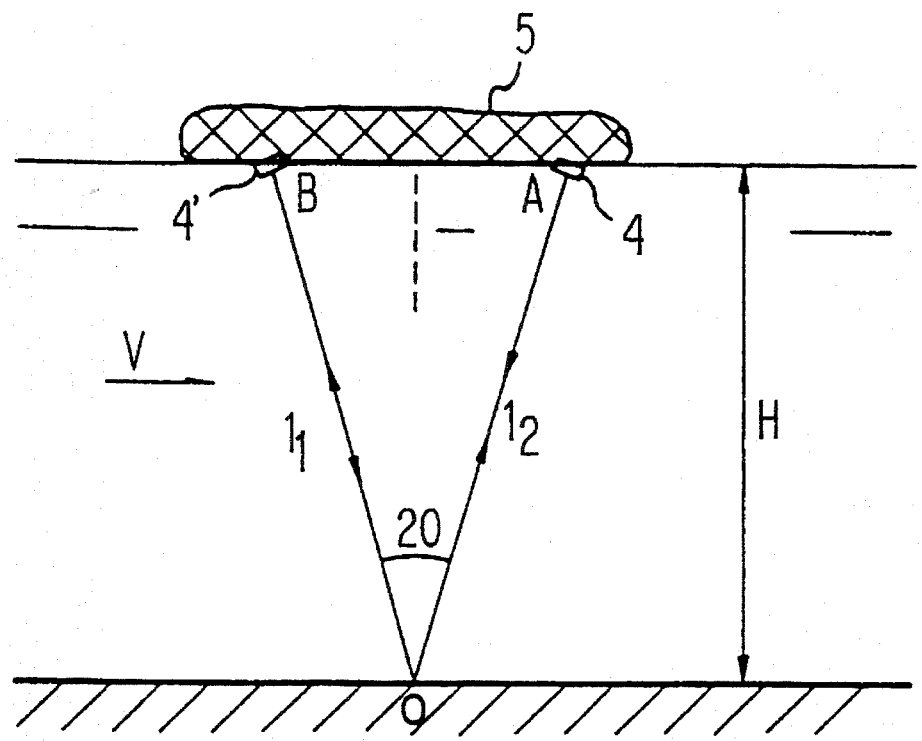
FIG. 3 is a diagrammatic view showing an ultrasonic perpendicular flow speed measuring method.
Figure 4A:
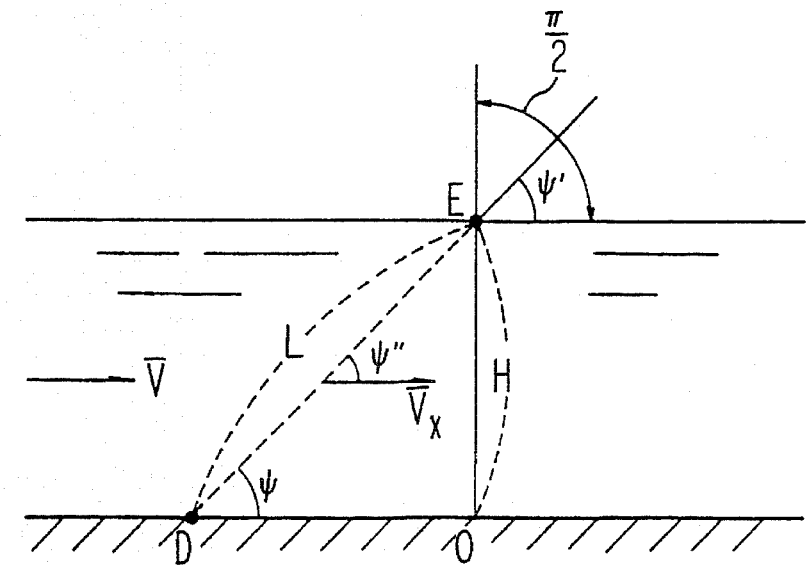
FIG. 4a illustrates the simplest ultrasonic average flow speed measuring method using rods.

Before describing the invention specifically, problems encountered in measuring an average perpendicular flow speed $\overline{V}_x$ of the water flow in a river are explained. FIG. 4a illustrates the simplest ultrasonic average flow speed measuring method using rods. The illustration is exaggerated to facilitate explanation. As shown in the figure, ultrasonic vibrators are installed at points (D, E) and it is assumed that the surface and bottom of the river are parallel with each other and with the flow direction of the water. In other words, assume that the flow direction of the water is perpendicular to the measuring section, i.e., to the vertical line (EO). In this case, the propagation time of the ultrasonic pulse from D to E and from E to D ($t_{DE}$, $t_{ED}$) are measured to evaluate $\Delta t$ and $\Delta f$ using the following equations.

$$\Delta t = \frac{2LV}{C^2} = \frac{2L\overline{V}_x \cos\psi}{C^2} \quad (1)$$

$$\Delta f = \frac{1}{t_{DE}} - \frac{1}{t_{ED}} = \frac{2V}{L} = \frac{2\overline{V}_x \cos\psi}{L} \quad (2)$$

$$\overline{V}_x = \frac{\Delta t c^2}{2L\cos\psi} \quad (3)$$

$$\overline{V}_x = \frac{\Delta f L}{2\cos\psi}$$

That is, the average perpendicular flow speed ($\overline{V}_x$), perpendicular to the vertical line (EO), is measured. In equations (1) to (3), C is the ultrasonic wave speed. The vertical line (EO) is the very depth at the flow speed measuring point. This flow speed measuring method is widely used in pipe type ultrasonic flowmeters wherein the diameter of the pipe may be considered to be the depth (H). (There are numerous examples of measuring flow speeds in pipes. A good example is the flowmeter UL 600R developed by Tokyo Keiso K. K.)

Figure 5A:
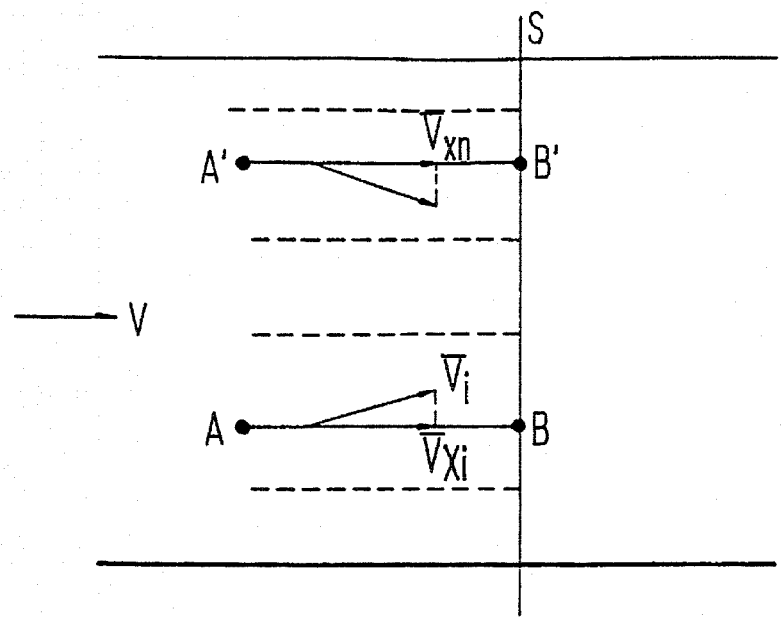
FIG. 5a illustrate a method measuring the average perpendicular flow speed at several points.

As suggested in FIG. 5a, local average perpendicular flow speeds ($\overline{V}_{xi}$) can be measured at a plurality of points along the flow rate measuring section and the flow rate can be evaluated by substituting the local vertical average flow speed ($\overline{V}_{xi}$) and the depth ($H_i$) at the measuring point in the <<flow speed×area>> equation. If, as shown in FIG. 5a, the flow direction of plane perpendicular to the flow rate measuring section, using equation (3) results in obtaining the flow speed components perpendicular to the measuring section, which are the flow speed components required for flow rate evaluation.

Figure 4B:
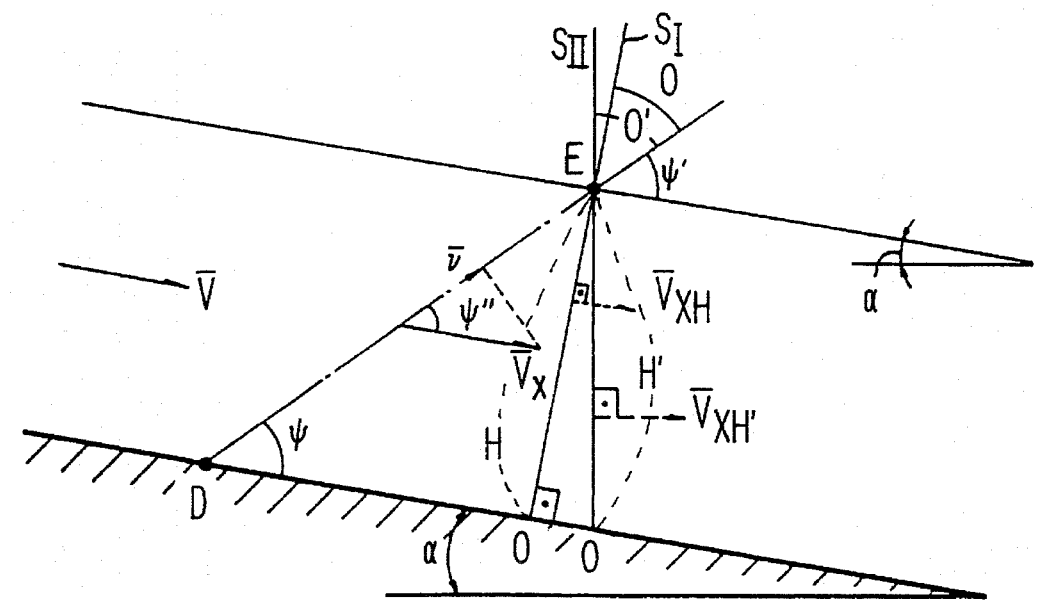
FIG. 4b illustrates a measuring method of the flow in a waterway having a gradient.

Actually making the measurements is not so simple and has a few problems. As shown in FIG. 4b, which is exaggerated to facilitate explanation, water flows in an open waterway because of the gradient of the waterway. Angle ($\alpha$) is the gradient of the waterway bottom and $\alpha'$ is the angle between the actual water surface in the waterway and the true horizontal surface. Strictly speaking, the surface gradient ($\alpha'$) of a river is not equal to $\alpha$. Generally, the difference between $\alpha$ and $\alpha'$ is not great, but is not negligible when there is a rising tide or a downstream obstacle. In this case, there is a problem in deciding what the depth is. That is, the depth must be chosen among the length (H) of the line (EO) perpendicular to the bottom, the length of a line perpendicular to the actual water surface, and the length (H') of the line (EO') perpendicular to the true horizontal surface regardless of the gradient of the watercourse. In the hydrographic point of view, H should be used as the depth. But, in the case where the bottom gradient cannot be measured directly, the distance (H'), measured on the line perpendicular to the true horizontal surface, is often considered to be the depth. With respect to the flow rate measurement, any one of sections $S_I$ or $S_{II}$ on H or H,' respectively may be selected on the essential condition that flow speed components perpendicular to the selected section must be measured. (The perpendicular flow speed components ($\overline{V}_{XH}$, $\overline{V}_{XH'}$) perpendicular to the lines (H, H') are shown in dotted lines.)

To place ultrasonic vibrators at points (D, E), a rod is installed vertically and another rod is installed inclined in the river. Installing one rod vertically may be performed, for example, by monitoring the rod being vertical with a level attached on the top of the rod. However, it is difficult to directly measure the angle between the inclined rod immersed in water and the bottom, i.e., the angle ($\psi$) between line (DE) and line (DO). Thus, the angle ($\psi'$) between the surface and the inclined rod is considered to be the angle ($\psi$) on the assumption that the angle between the surface and the vertical rod is 90°. That is, the angle ($\Theta$) between the vertical rod and the inclined rod, line (OE) and line (DE), is measured and $\psi$ is calculated by $\psi'=90°-\Theta=\psi$. However, since, as shown in FIG. 4b, (1) actually $\psi\neq\psi'$, and (2)$\psi''\neq\psi\neq\psi'$ ($\psi''$ being the angle between the flow direction of the average perpendicular flow speed ($\overline{V}_x$) and line (DE)). The flow speed component (υ) measured on line (DE) equals $V_x\cos\psi''$, and the measured $\overline{V}_x'=\beta/\cos\psi'$ (with the average flow speed ($\beta$) considered to be $\beta=\overline{V}_x\cos\psi'$), cannot be the flow speed component perpendicular to line (OE). Therefore, there is an error in measuring the flow speed.

Figure 5B:
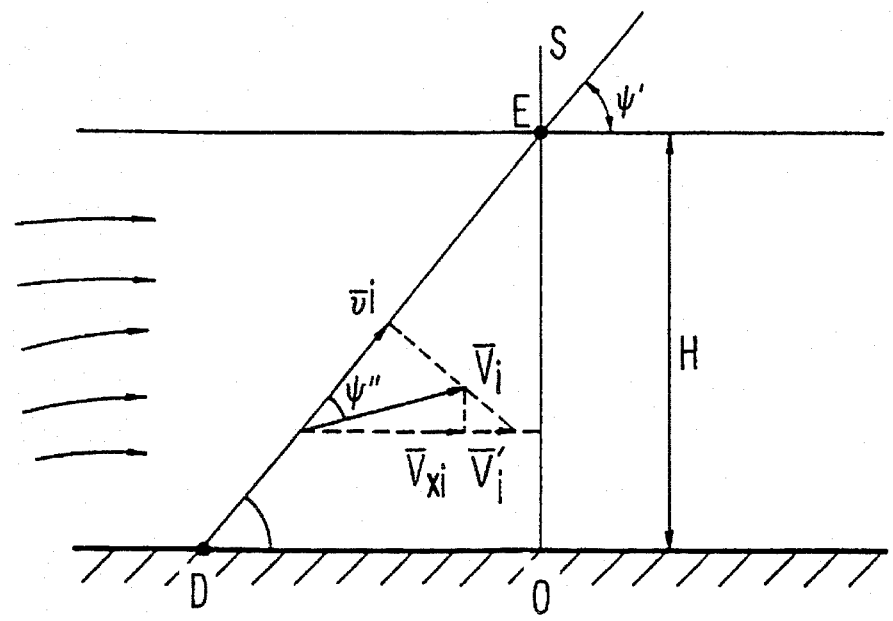
FIG. 5b illustrates a flow speed measuring method for a waterway with a small gradient.

Furthermore, the flow in an open watercourse is more complex than in a pipe because of the complex shapes of the bottom and the sides of the watercourse. Also, an open watercourse has rotating flow speed components. In such conditions, generally the angle $\psi''$ differs by a few degrees from the angle $\psi'$ or $\psi$. This phenomenon also occurs when the flow speed is very low because the watercourse gradient is very small as shown in FIG. 5b. Nevertheless, if $\overline{V}_x$ is calculated as $\overline{V}_x=\beta/\cos\psi$, as shown in FIG. 5b, since $\overline{V}$ is larger than $\overline{V}_x$ which is the flow speed component perpendicular to line (OE), a large flow speed measuring error results. Therefore, in measuring the average perpendicular flow speed in an open watercourse using an ultrasonic measuring method, in order to reduce the average flow speed measuring error and consequently the river flow rate measuring error, the above-described problems must be solved in cases other than for closed watercourses such as pipes. Therefore, the known conventional method for measuring the flow speed in pipes using ultrasonic waves should not be used for measuring flow speeds of a river.

The present invention provides a new ultrasonic flowmeter to solve the problems of such conventional ultrasonic flowmeters.

Figure 6A:
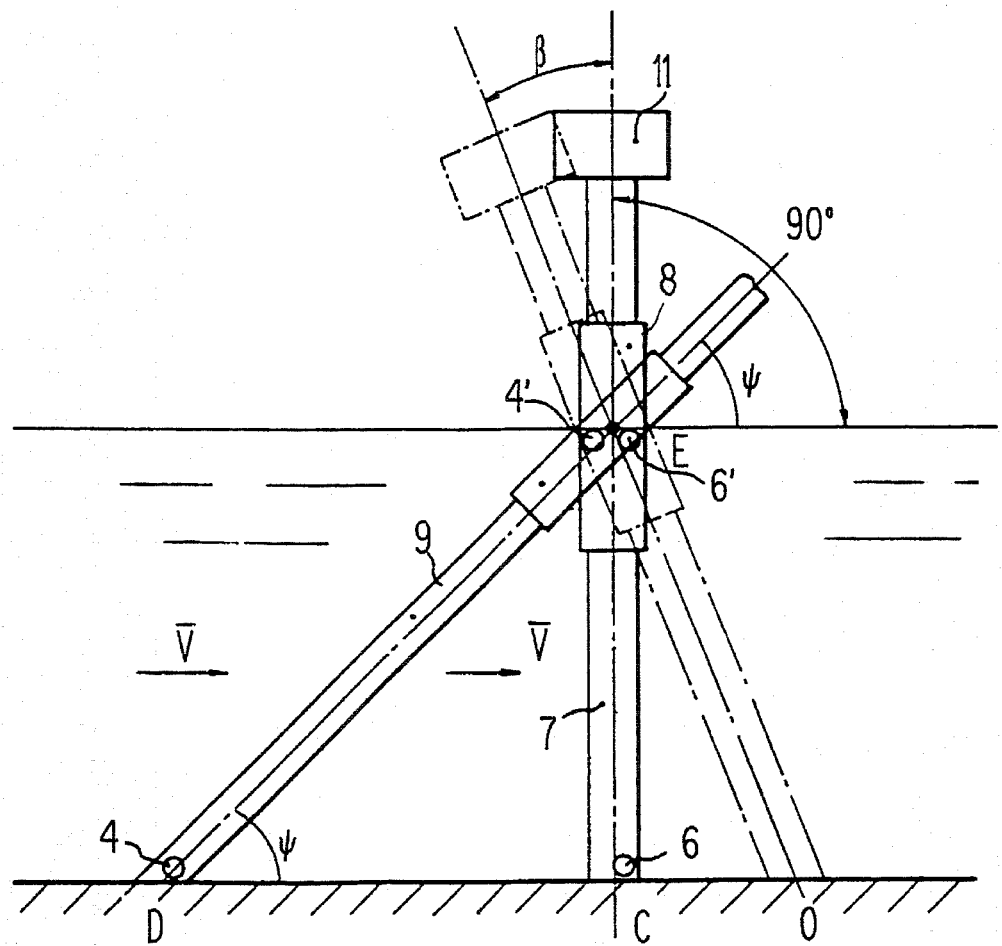
FIG. 6a illustrates the principle of a flowmeter embodying features of the present invention.

FIG. 6a illustrates the principle of the flowmeter of the invention. FIG. 6a shows vibrators (4, 4', and 6, 6') transmitting or receiving ultrasonic waves, a vertical measuring rod (7), a cylinder (8) movable up and down along the vertical measuring rod (7), an inclined rod (9) with an ultrasonic vibrator (4) attached on its end to position the vibrator (4) at the bottom of the river with a predetermined angle ($\psi$), and an inclined rod cylinder (10) movable along inclined rod (9). The inclined rod cylinder (10) and the vertical rod cylinder (8) are connected by a hinge axis and are adapted to be pivoted about the axis and with each other. A level (11) is positioned on the top of the vertical rod (7). The vibrators (4', 6') are attached on the inclined rod cylinder (10) and the vibrator (6) is attached at the lower end of the vertical rod. The calculating part of the flow meter is not shown in FIG. 6a.

The measuring principle is as follows. When measuring a flow rate without considering the gradient of a watercourse, it is convenient to select the section (S) of the water flow vertical because it is easy to measure the depth (H'). Therefore, H' shown in FIG. 4b becomes the depth. First, the flow sped measuring device is set up in a river as shown in solid lines in FIG. 6a. Then the vertical rod (7) is set vertical with the level (11). The distance (L) between the ultrasonic vibrators (4, 4') is predetermined. The inclined rod (9) is fixed to the cylinder (10) while simultaneously measuring the angle ($\psi$). The angle ($\psi$) can be measured by an angle sensor (not shown in FIG. 6a) connected to the axis of the cylinder (10). Of course, the angle ($\psi$) made by the horizontal surface is not directly measured but is evaluated by measuring the angle ($\gamma$) between the rods (9, 7) and the equation $\psi=90°-\gamma$. After setting the vertical rod (7) vertical and measuring the angle ($\psi$), the ultrasonic flowmeter is operated and ultrasonic pulses are transmitted from the vibrator (6) to the vibrator (6') and from the vibrator (6') to the vibrator (6) and the time difference $\Delta t_1 = t_{EC} - t_{CE}$ or $\Delta t_1 = t_{CE} - t_{EC}$ is measured. When the time difference $\Delta t_1 \neq 0$, it means that the direction of the average flow speed is not perpendicular to the vertical rod. In this case, the position in which $\Delta t_1 = 0$ is sought by inclining the vertical rod (7) slowly in the plane in which the rods are positioned, as shown in FIG. 6a in dotted lines. Of course, there cannot be a position where $\Delta t_1$ is exactly 0, but the position where the average value is 0 can be found easily by measuring $\Delta t_1$ continuously. When the position is found, the inclination angle ($\beta$) of the vertical rod (7), measured, for example, counterclockwise from the vertical position, is determined. Then the vertical rod is set vertical again and the vibrators (4, 4') are operated to measure the ultrasonic pulse propagation times $t_{DE}$ and $t_{ED}$. In this case, $$t_{DE} = \frac{L}{C+\upsilon} \quad \text{and} \quad t_{ED} = \frac{L}{C-\upsilon}$$

Figure 6B:
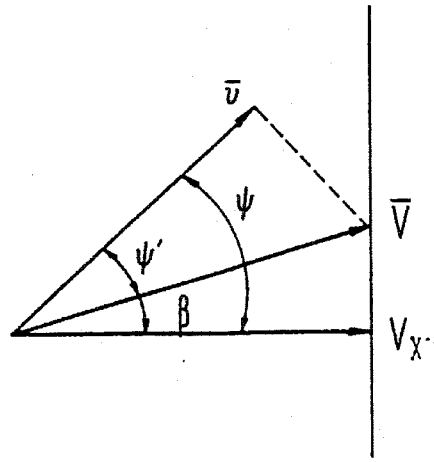
FIG. 6b illustrates the relationship between flow velocity components.

As shown in FIG. 6b, the flow speed component $$\beta = \overline{V}\cos\psi'; \ \overline{V} = \beta/\cos\psi' \quad (4)$$

That is, $\beta \neq \overline{V}\cos\psi$.

The flow speed component to be measured is $V_x$, which is the flow speed component perpendicular to the vertical line, and as can be seen from FIG. 6b, $$\overline{V}_x = \overline{V}\cos\beta = \frac{\overline{\upsilon}\cos\beta}{\cos\psi'} = \frac{\overline{\upsilon}\cos\beta}{\cos(\psi-\beta)} \quad (5)$$

When the time difference method is used, $$\Delta t = t_{ED} - t_{DE} = \frac{2L\overline{V}_x \cos(\psi-\beta)}{C^2\cos\beta}$$

$$\overline{V}_x = \frac{\Delta t C^2 \cos\beta}{2L\cos(\psi-\beta)} \quad (6)$$

C is the ultrasonic wave speed, and since it varies by the temperature and the composition of the water of the river, it should be determined when measuring the flow speed. The equation evaluation C is as follows.

$$C = \frac{2L}{t_{DE} + t_{ED}} \quad (7)$$

When deriving equation (7), $\upsilon^2/C^2$ was neglected because it has a negligible value. Substituting (7) into (6), the average flow speed is:

$$\overline{V}_x = \frac{2L\Delta t\cos\beta}{(t_{DE}+t_{ED})^2\cos(\psi-\beta)} \quad (8)$$

Equation (8) is the final equation of the vertical average flow speed measurement.

Measuring the depth (H') is also performed by using the ultrasonic measuring method. Summing $t_{CE}$ and $t_{EC}$ measured by the vibrators (6, 6') results in:

$$t_{CE} + t_{EC} = 2H'/C$$

$$H' = \frac{(t_{CE}+t_{EC})C}{2}$$

Substituting the expression for C from equation (7), $$H' = \frac{(t_{CE}+t_{E_{EC}})L}{t_{DE}+t_{ED}} \quad (9)$$

Equation (9) is used to evaluate the depth (H'). $H'_i$ measured at a plurality of points is required to calculate the sectional area (S) which, in turn, is required for the flow rate calculation.

Therefore, the parameters measured directly for calculating the average perpendicular flow speed ($\overline{V}_x$) and the depth (H') required for calcurating the flow rate of a river are only $t_{DE}$, $t_{ED}$, $t_{CE}$, $t_{EC}$, $\psi$, and $\beta$. The distance (L) is measured previously and is input and stored in the arithmetic unit of the flowmeter.

According to the invention, each average flow speed on vertical lines at a plurality of positions of the water flow of a river is measured at one time from the bottom to the surface of the river. Specifically, the flow speed component perpendicular to the section of the water flow, the flow rate of which is to be measured, is measured accurately and the depth at the respective point is simultaneously measured. The measuring time of the vertical average flow speed at each point is reduced by a factor of more than 100 compared with the measuring time using a local flowmeter.

Figure 7:
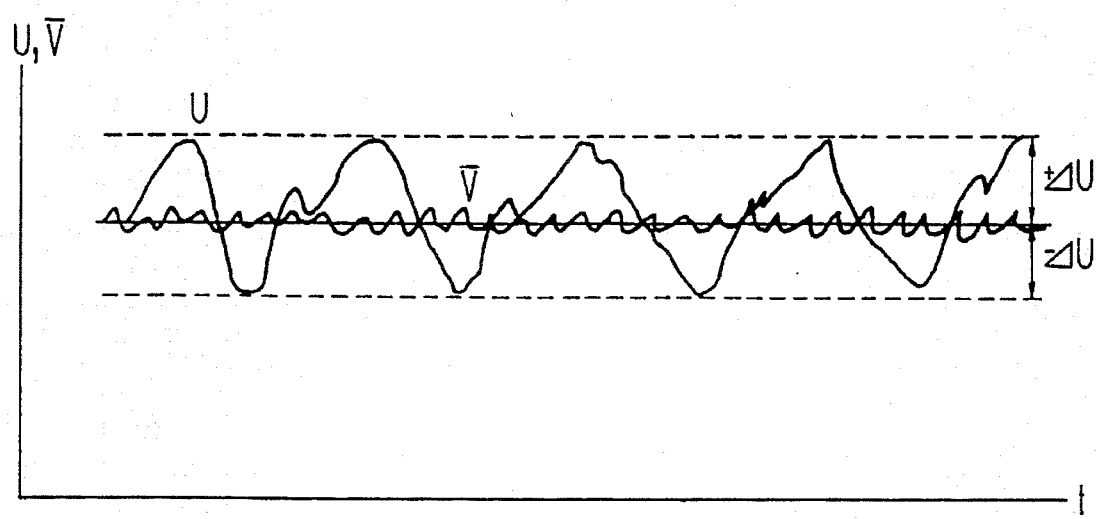
FIG. 7 is a graph showing the fluctuation of a local flow speed.

An average local flow speed ($\overline{u}_i$) is measured by continuous measurement for a substantial time since the fluctuation rate of a local flow speed is very high. The amount of change ($\pm\Delta U$) of the flow rate about the average value is 10–15% of the average value. FIG. 7 shows the fluctuation of the local speed (U) measured by a propeller-type flowmeter. A mechanical flowmeter senses 0.1–0.5 Hz of fluctuation frequency. Since the fluctuation of a local flow speed is so high, the continuous flow sped is measured for 5-10 minutes to obtain a relatively accurate average value of the local flow speed (to minimize the deviation between the average values). Sometimes, it takes 20 minutes for more accurate measurement of the average value. When the flow speed from the bottom of a river to the water surface is measured with the ultrasonic measuring method, the fluctuation rate is lowered substantially as shown in FIG. 7, and $\pm\Delta V/\overline{V}$ does not exceed 1-1.5%. The fluctuation period is represented by the time of performing the ultrasonic flow speed measuring once.

Figure 8:
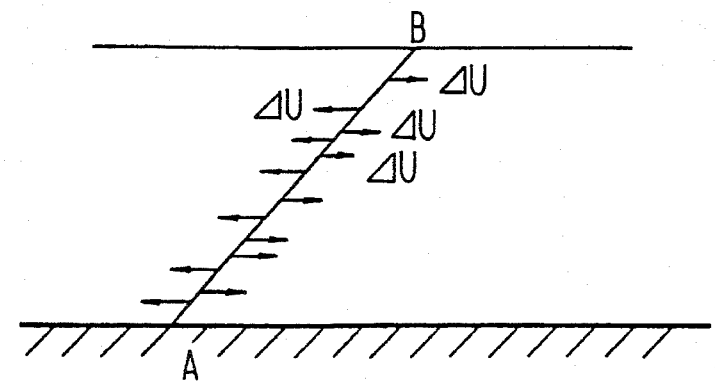
FIG. 8 illustrates the flow fluctuation direction change.

The reason for the reduction in fluctuation rate by more than ten times is because the flow speed fluctuation direction change is arbitrary and the entire water flow does not fluctuate in one direction simultaneously, as shown in FIG. 8. Therefore, if the average perpendicular flow speed along line (AB) is measured in one instant, the fluctuations $\pm\Delta U$ compensate for each other. Thus, when the average flow speed component in the ultrasonic wave propagation direction is $\beta=3$ m/s, and the length of the line (AB) is L=5 m, the time taken to measure the flow speed once is $$2t_{DE} = 2\frac{L}{C+v} = \text{approximately 7 milliseconds.}$$

Flow speed calculations after continuous measuring and storing of $t_{DE}$ and $t_{ED}$ can show flow speed distribution of, for example, 100 Hz. From numerous experiments, it has been ensured that the deviation of the average flow speed for 5 seconds is less than 1% regardless of the depth (H). (500 measurements are performed during the 5 seconds.)

According to the invention, about 30 seconds are required for measuring the angle ($\beta$) and the average flow speed after installing the vertical rod and the inclined rod in a river. To measure the average flow speed relatively accurately with a mechanical local flowmeter, local flow speeds should be measured at a minimum of 5 points. The flow speed measurement at each point should be performed for 10 minutes and furthermore, factoring in the time taken to locate the flowmeter at the predetermined points, it takes 60 minutes not including the time taken to calculate the local flow speeds and the average flow speed. Thus, the measuring time is 120 times longer (including the flow speed calculation time) than for the ultrasonic flowmeter.

According to the invention, the flow speed measuring time is substantially reduced. Thus, the flow rate measuring time is reduced and the measuring accuracy is increased.

Figure 9A:
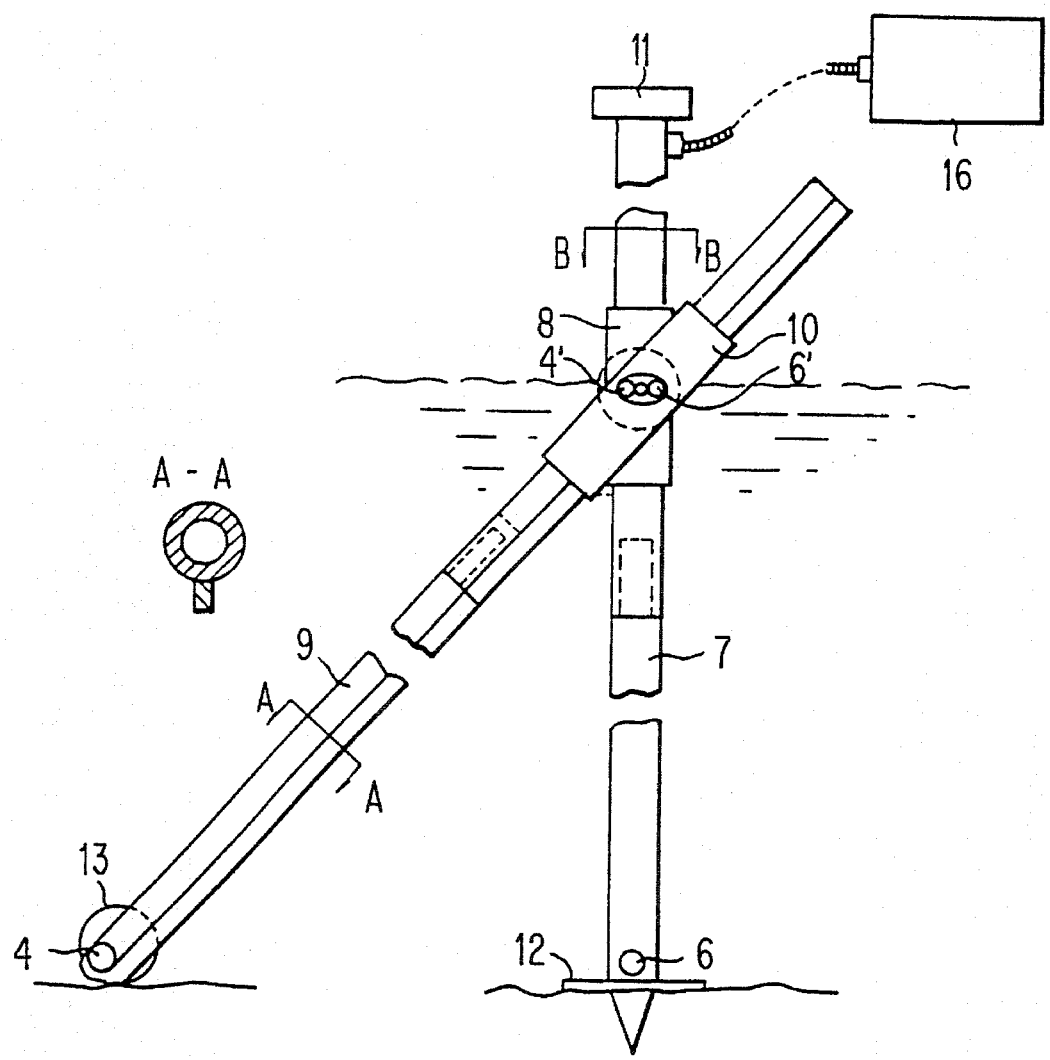
FIG. 9a is a front elevational view of a flowmeter embodying features of the present invention.
Figure 9B:
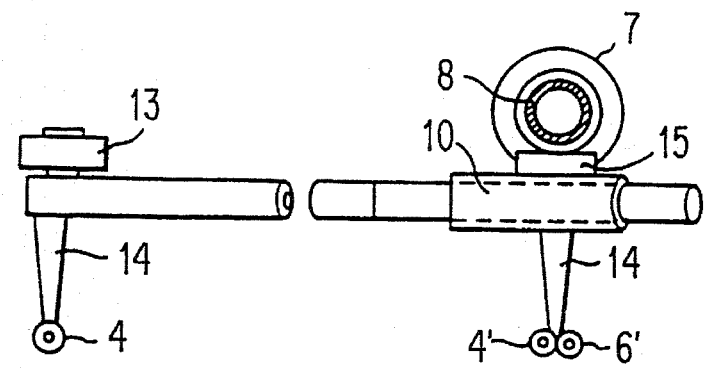
FIG. 9b is a plan view of a flowmeter embodying features of the present invention.
Figure 10:
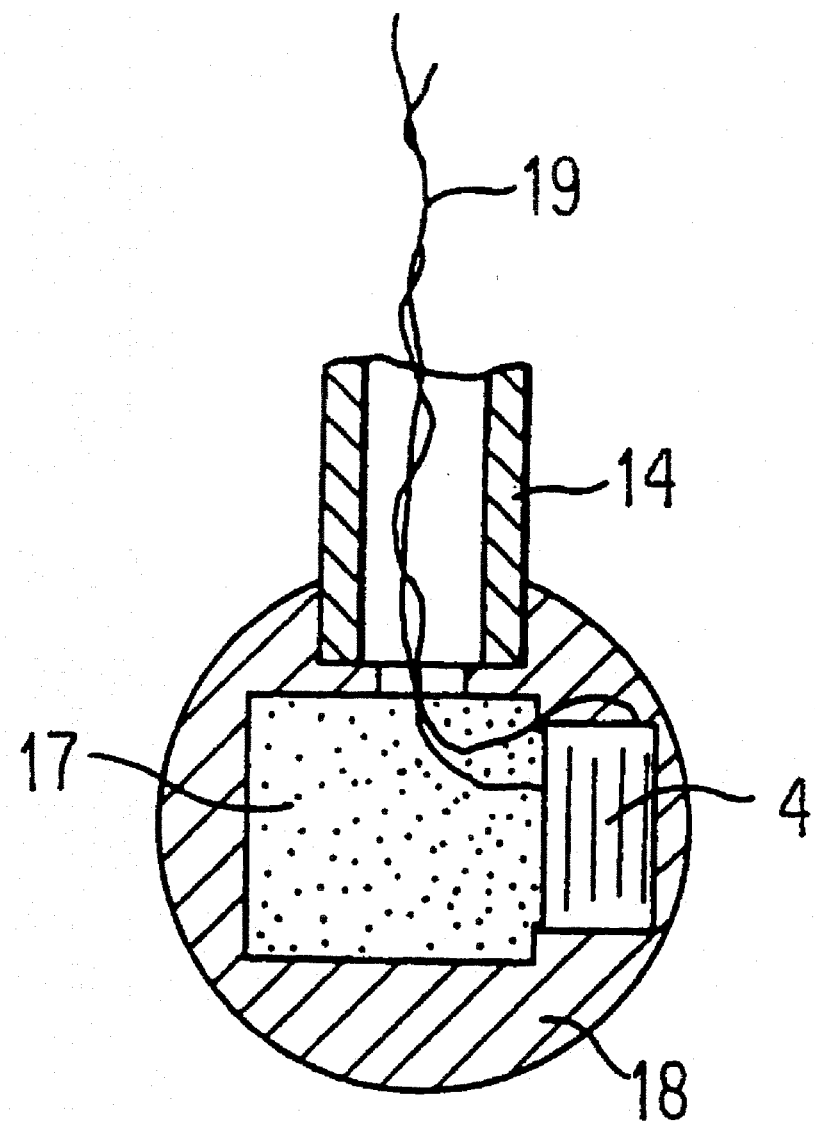
FIG. 10 is a sectional view of a ultrasonic vibrator.

FIGS. 9a and 9b show an embodiment of the invention. The Figures show a circular flange (12) preventing the vertical rod from being driven too far into the bottom of the river, a wheel (13) facilitating the movement of the inclined rod (9) along the bottom for adjusting the position of the rod, support rods (14) for supporting ultrasonic vibrators (4, 4', 6, 6'), a sensor (15) measuring the angle, and a calculating part (16). The calculating part (16) comprises circuits for ultrasonic pulse oscillation, ultrasonic pulse receiving, signal amplification, and pulse generation, etc., a microprocessor for measuring time, and flow speed calculation, etc., and a display displaying the measured results. The length of the support rods (14) must be longer than the diameter of the inclined rod (9) by a minimum of 5 times. The support rods (14) serve the role of spacing the flow speed measuring area from the disturbed area created by flow disturbance with the inclined rod and the vertical rod. The inclined rod (9) and the vertical rod (7) are made of light alloy pipes and have unit lengths of 1-1.5 m for assembly and disassembly. The inclined rod is reinforced, as shown in section A—A, so that it will not be deflected by the force of the water flow. The level (11) should be able to sense the level on all sides and may have the shape of a cross. The exterior shape of the ultrasonic vibrator is spherical. For example, FIG. 10 shows the ultrasonic vibrator (4) is contained in a spherical case (for the case where a circular piezo ceramic piece is used). FIG. 10 shows a shell (18), filler (17) for guiding the vibration energy all to the front face, for example tungsten powder, and conductors (19) connected with the piezo ceramic electrode. The reason of for using a spherical shape is that a sphere is most appropriate for minimizing the flow disturbance adjacent the vibrator when the inclined rod is immersed in a river in various angles. FIG. 9a shows the vibrators (4', 6') separately to facilitate understanding. It is preferably to use one ultrasonic vibrator having circular direction without separating the vibrators (4', 6'). The vibrator (4', 6') is positioned to a line perpendicular to the axis of the cylinder (10). In FIGS. 9a and 9b it is shown as if cables connecting the ultrasonic vibrators and the angle sensor (15) are wired through the interiors of the inclined rod (9), the vertical rod (7), and the support rods (14). But this makes the assembly and disassembly of the rods very inconvenient. Therefore, it is convenient to attach the cables to the exterior of the rods and along the rods. The device shown in FIG. 9a, not including the calculating part 916), is called the flow speed measuring device.

Figure 11:
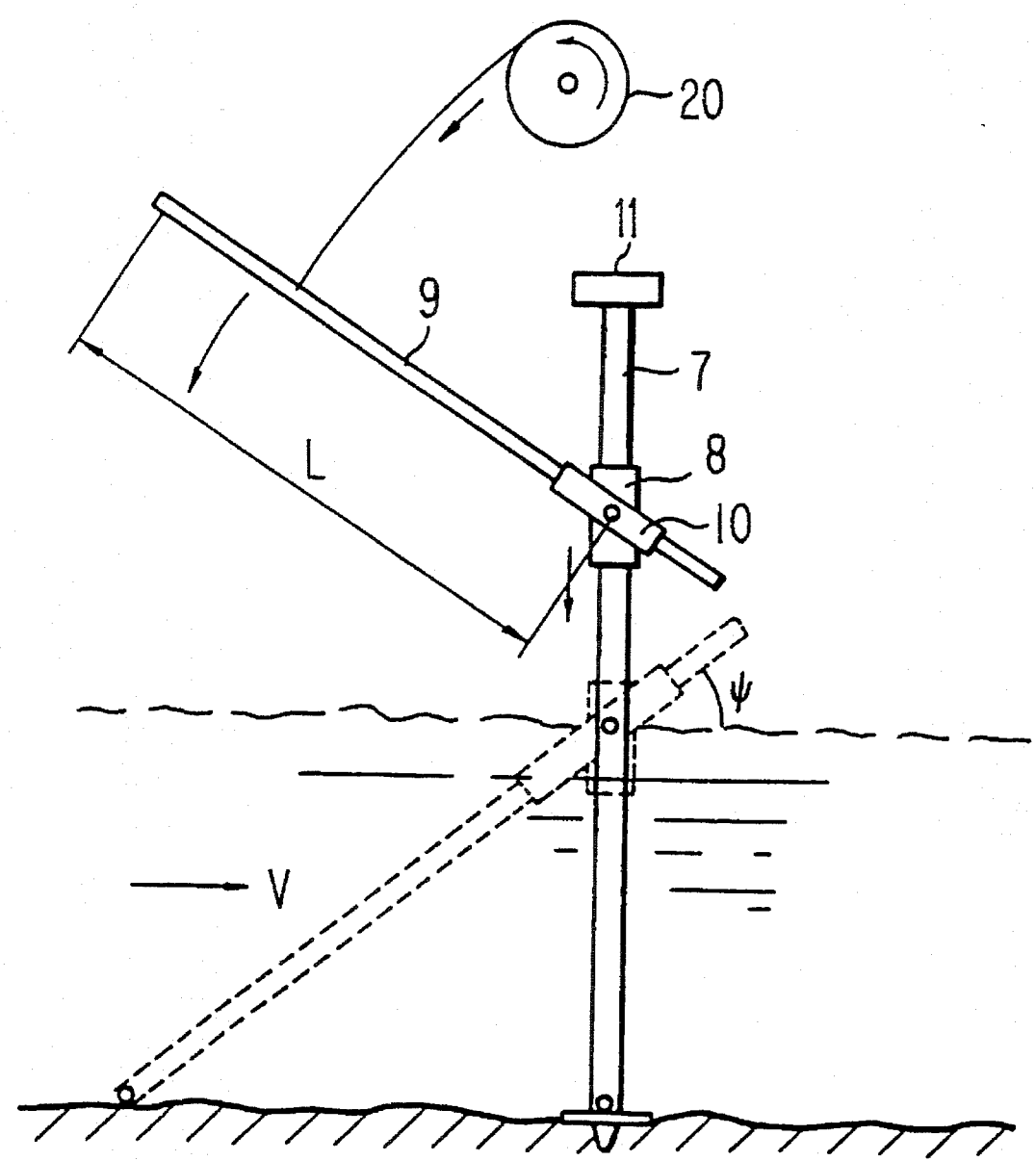
FIG. 11 is a diagrammatic view showing a sequence of steps for installing the flow speed measuring device in a river.

Referring to FIG. 11, the sequence of installing the flow speed measuring device at a predetermined point in a river is explained below. Since the approximate depth is known before starting the flow speed measuring, the distance (L) between the vibrators (4, 4') is selected in advance (for example, the angle $\psi$ to be 30°-45°) and the inclined rod (9) is secured to the cylinder (10). Then the vertical rod (7) is driven into the bottom of the river and vertically positioned. Then the calculating part (16) is operated. At this time only the vibrators (6, 6') in the depth direction are operated. Simultaneously, the cylinder (8) is moved downwards along the vertical rod (7) and the inclined rod (9) is pivoted to the water surface. The inclined rod is pivoted downward by, for example, unwinding a rope wound on a drum (20) (There are various simple devices for moving the cylinder (8) up and down along the vertical rod (7), although they are not shown in FIG. 9a). When the vibrator (6') contacts the water surface as the cylinder (8) is moved down, the flowmeter display shows $\Delta t_1 = t_{EC} - t_{CE}$. Then the inclined rod (9) is pivoted down to the bottom of the river. The end of the inclined rod (9) is pushed to the bottom and stabilized thereto by the force of the water flow. Then the vertical rod (7) is set vertical with the level (11) and the angle between the inclined rod (9) and the vertical rod (7) is input to the calculating part (16) and $\psi=90°-\Theta$ is calculated and stored. If $\Delta t_1 \neq 0$, the position in which $\Delta t=0$ is sought by inclining the vertical rod slightly back and forth. When such position is found, the inclined angle ($\beta$) is measured and stored. The output of the angle sensor is $\psi'=\psi\pm\beta$. Therefore, subtracting the stored angle $\psi$ from $\psi'$ gives $-\beta$ or $+\beta$, and the calculated $\beta$ is stored. Then the vertical rod (7) is returned to the vertical position. Then the vibrators (4, 4') are operated and the calculating part measures and calculates the flow speed and the depth.

The operating algorithm of the calculating part (16) is as follows.

1) With the vertical rod (7) set vertical,
   the ultrasonic wave propagation time from the vibrator (6) to the vibrator (6'), and from the vibrator (6') to the vibrator (6), $t_X$ and $t_{EC}$, respectively, are measured many times and the average value $\Xi_{CE}$ and $\Xi_{EC}$ are calculated and stored.

the angle ψ is measured and stored.

repeated calculation and display of $\Delta t_1 = \Xi_{CE} - \Xi_{EC}$ (or $\Xi_{EC} - \Xi_{CE}$)

2) When $\Delta t_1 \neq 0$, the angle β is measured and stored.

3) The distance L between the vibrators (4, 4') is stored.

4) The ultrasonic pulse propagation time between the vibrators (4, 4'), $\Xi_{DE}$, $\Xi_{ED}$ are measured and stored.

5) The average vertical flow speed is calculated by the equation.

$$\overline{V}_x = \frac{2L(\bar{t}_{ED} - \bar{t}_{DE})\cos\beta}{(\bar{t}_{DE} + \bar{t}_{ED})^2 \cos(\psi - \beta)}$$

The calculated result is displayed.

6) The depth is calculated and displayed.

$$H = \frac{(\bar{t}_{EC} + \bar{t}_{CE})L}{\bar{t}_{DE} + \bar{t}_{ED}}$$

The time difference method is used in step (5), and the frequency difference method can of course, be used.

$$\overline{V}_x = \frac{\Delta f L \cos\beta}{2\cos(\psi - \beta)}$$

In summary, according to the invention, 1) the time needed to measure the average perpendicular flow speed is substantially reduced; 2) the measuring accuracy of the average flow speed is substantially improved compared with that of the conventional measuring method, and the flow rate measuring error is substantially reduced; 3) the depth is measured quickly and accurately compared with the conventional method; 4) The flow speed when the depth is shallow, which is measured with a large error with the conventional method, can be measured accurately.

The device of the invention is used most effectively when the depth of the water is not very deep (3 to 5 m), because it uses the vertical rod and the inclined rod, etc.

We claim:

1. A method for simultaneously measuring the flow speed and the depth of a river using ultrasonic waves to measure average flow speed at a plurality of points in the water flow of a river to measure the flow rate of the river, comprising the following steps, (a) Installing ultrasonic transducers at a first point on the bottom of the river, a second point on the water surface, and a third point on the bottom of a river plumb to said second point and storing the angle (ψ) between the water surface and the line connecting said first and second points and the distance (L) between said first and second points;

(b) Measuring the ultrasonic wave propagation time ($t_{EC}$ and $t_{CE}$ from point (E) to point (C) and from point (C) to (E) by operating the ultrasonic transducers installed at points (E, C), making the time difference ($\Delta t_1 = t_{EC} - t_{CE}$) to be zero, and measuring and storing the angle (β) between the plumb line and the line connecting the points (E, C);

(c) Returning the point (E) to its original position, and measuring and storing $t_{EC}$ and $t_{CE}$;

(d) Measuring and storing the ultrasonic wave propagation time ($t_{DE}$ and $t_{ED}$) from point (D) to point (E) and from point (E) to (E) by operating the ultrasonic vibrators installed at points (D, E);

(e) Evaluating the average flow speed ($\overline{V}_x$) using the stored data L, ψ, $t_{EC}$, $t_{CE}$, $t_{DE}$, and $t_{ED}$ by the equation of the time difference ($\Delta t = t_{ED} - t_{DE}$) method:

$$\overline{V}_x = \frac{2L(t_{ED} - t_{DE})\cos\beta}{(t_{DE} + t_{ED})^2 \cos(\psi \mp \beta)}$$

or the equation of the frequency difference $$\left( \Delta f = \frac{1}{t_{DE}} - \frac{1}{t_{ED}} \right)$$

method $$\overline{V}_x = \frac{L\left(\frac{1}{t_{DE}} - \frac{1}{t_{ED}}\right)\cos\beta}{2\cos(\psi \mp \beta)}$$

and evaluating the depth (H') of the river by the equation $$H' = \frac{t_{CE} + t_{EC}}{t_{DE} + t_{ED}} L.$$

2. A device for simultaneously measuring the flow speed and the depth of a river using ultrasonic waves to measure average flow speeds at a plurality of points in the water flow of a river to measure the flow rate of the river, comprising, a flow speed measuring device and a calculating means, said flow speed measuring device includes a vertical rod (7), an inclined rod (9), a vertical rod cylinder (8) movable up and down along the vertical rod, an inclined rod cylinder (10), through which the inclined rod can move, installed at an axis fixed perpendicular to the vertical rod cylinder (8), an angle sensor (15) measuring the angle between the vertical rod (7) and the inclined rod (9), support rods (14) installed at said axis and the ends of the vertical rod and the inclined rod (9) opposite to said axis, ultrasonic vibrators (4, 4',6, 6') installed at the ends of said support rods (14) spaced form the vertical rod and the inclined rod, and a level (11) attached to the top of the vertical rod (7), and said calculating means (16) includes an ultrasonic pulse oscillation circuit, ultrasonic pulse generation, receiving, and amplification circuit, an analog-digital signal conversion circuit, a microprocessor including a memory circuit, a digital signal processing circuit, an arithmethic unit circuit, and a display displaying the measured result, and high frequency wave cables connected to the flow speed measuring device.

* * * * *